United States Patent
Mourtel et al.

(10) Patent No.: US 9,122,903 B2
(45) Date of Patent: Sep. 1, 2015

(54) METHOD OF MANAGING COMMUNICATIONS WITH A NFC CONTROLLER

(75) Inventors: Christophe Mourtel, Marseilles (FR); Valérie Gleize, Rougiers (FR)

(73) Assignee: GEMALTO SA, Meudon (FR)

( * ) Notice: Subject to any disclaimer, the term of this patent is extended or adjusted under 35 U.S.C. 154(b) by 421 days.

(21) Appl. No.: 13/643,099

(22) PCT Filed: May 2, 2011

(86) PCT No.: PCT/EP2011/056932
§ 371 (c)(1),
(2), (4) Date: Oct. 24, 2012

(87) PCT Pub. No.: WO2011/147660
PCT Pub. Date: Dec. 1, 2011

(65) Prior Publication Data
US 2013/0040566 A1 Feb. 14, 2013

(30) Foreign Application Priority Data
May 27, 2010 (EP) ...................................... 10305558

(51) Int. Cl.
G06K 7/00 (2006.01)
G06K 7/10 (2006.01)
H04W 4/00 (2009.01)

(52) U.S. Cl.
CPC .......... *G06K 7/0008* (2013.01); *G06K 7/10237* (2013.01); *G06K 7/10247* (2013.01); *H04W 4/00* (2013.01)

(58) Field of Classification Search
None
See application file for complete search history.

(56) References Cited

U.S. PATENT DOCUMENTS

| 2008/0121687 A1* | 5/2008 | Buhot ........................... 235/375 |
| 2008/0162312 A1* | 7/2008 | Sklovsky et al. ............... 705/35 |
| 2008/0162361 A1* | 7/2008 | Sklovsky et al. ............... 705/65 |
| 2009/0191812 A1 | 7/2009 | Teruyama et al. |
| 2009/0199206 A1 | 8/2009 | Finkenzeller et al. |
| 2010/0009627 A1* | 1/2010 | Huomo ........................ 455/41.1 |
| 2011/0130095 A1 | 6/2011 | Naniyat et al. |

FOREIGN PATENT DOCUMENTS

| DE | 10 2006 027 200 A1 | 12/2007 | |
| EP | 2 075 921 | * 1/2009 | ............... H04B 5/00 |
| EP | 2 075 921 A2 | 7/2009 | |
| WO | WO 2010/011055 A2 | 1/2010 | |

OTHER PUBLICATIONS

International Search Report (PCT/ISA/210) issued on Jun. 22, 2011, by the European Patent Office as the International Searching Authority for International Application No. PCT/EP2011/056932.

\* cited by examiner

*Primary Examiner* — Tuan A Tran
(74) *Attorney, Agent, or Firm* — Buchanan Ingersoll & Rooney PC

(57) ABSTRACT

The invention is a NFC controller able to communicate in contact mode with first and second applications and able to establish and to manage a first communication between a contactless reader device and the first application by using a specific type of contactless protocol. The NFC controller is able to establish and to manage a second communication between the contactless reader device and the second application by using the specific type of contactless protocol. The NFC controller is adapted to handle simultaneously said first and second communications.

15 Claims, 2 Drawing Sheets

| UID1: | 1010 0000 0100 0101 1100 0000 0000 0001 |
| UID2: | 1010 0000 0111 0100 1100 0000 0000 0001 |
| CUID: | 1010 0000 01XX 010X 1100 0000 0000 0001 |

METHOD OF MANAGING COMMUNICATIONS WITH A NFC CONTROLLER

FIELD OF THE INVENTION

The present invention relates to methods of managing communications with a Near Field Communication (NFC) controller. It relates particularly to methods of managing communications with a NFC controller in a NFC device which is able to emulate several contactless cards.

PRIOR ART

The NFC (Near Field Communication) technology is based on the exchanging of data via a magnetic field. A NFC device may work according to three modes: card emulation mode, reader mode and Peer-To-Peer mode. In card emulation mode, the NFC device behaves like an existing contactless card. In reader mode, the NFC device has an antenna which is able to modulate the magnetic field and to provide energy to other NFC devices. The NFC device in reader mode is usually named a PCD (Proximity Coupling Device). In Peer-To-Peer (P2P) mode, two NFC devices are able to communicate together and to exchange information.

A NFC device may be a PICC (Proximity Integrated Circuit Card or Proximity Card) or may embed components which act as logical PICC. The PICC and the PCD communicate thanks to an inductive coupling in a field frequency equal to 13.56 MHz. In particular, the ISO14443 and ISO18092 standards provide modulation technologies and communication protocols which may be used in NFC domain.

Several physical PICC may be present in the magnetic field of a PCD. That is why specific process allowing the PCD to enumerate the PICC have been defined. These processes are named anti-collision mechanisms. Two main anti-collision strategies are usually carried out. The first one is a determinist method which is bit-oriented and the second one is a statistical method which is frame-oriented.

The determinist method is defined in the part 3 of the ISO14443 standard and is mainly used for products compliant with the ISO14443-A type. The statistical method is defined in the part 3 of the ISO14443 standard and is mainly used for products compliant with the ISO14443-B type or ISO18092.

In both anti-collision methods, each PICC sends its own identifier which may be called UID (Unique IDentifier) or PUPI (Pseudo Unique PICC Identifier). The PCD uses the received identifier for selecting a PICC according to the targeted application. Whatever the anti-collision strategy used, each identifier has a unique value that may change from a transaction to another one. Whatever the standard used, all the identifiers transmitted by the PICC are assumed to be different according to the principle described in the standards.

A NFC device may contain a plurality of applications which are intended to communicate with a PCD in order to perform applicative transactions. Each application is linked to a particular type of associated contactless protocol. In other words, each application can be accessed through its own type of associated contactless protocol only. For example, an application may be associated with the type A of the ISO14443 standard and another application may be associated with the type B of ISO14443 standard. In this example, a NFC controller may manage simultaneously the communication of the two applications through ISO14443 type A and ISO14443 type B. Current NFC controllers can manage only one card emulation mode of each type of contactless protocol at one point. Consequently, two applications associated with the same type of contactless protocol cannot simultaneously communicate with a PCD. Namely, if the two applications are associated with the type A of the ISO14443 standard, only one application can communicate with the NFC reader device at a time. Thus only one communication is active.

There is a need for allowing a NFC controller to allow simultaneous communications of two applications associated with the same type of contactless protocol.

SUMMARY OF THE INVENTION

An object of the invention is to solve the above mentioned technical problem.

The object of the present invention is a NFC controller capable of communicating in contact mode with first and second applications. The NFC controller is capable of establishing and managing a first communication between a contactless reader device and the first application by using a specific type of contactless protocol. The NFC controller is capable of establishing and managing a second communication between the contactless reader device and the second application by using said specific type of contactless protocol. The NFC controller is adapted to handle simultaneously said first and second communications.

Advantageously, the contactless reader device is able to detect the presence of a plurality of contactless cards in its electromagnetic field and the NFC controller may be adapted to simulate the presence of several contactless cards in the field of the reader device during an anti-collision phase.

In a preferred embodiment, a first identifier may be associated with the first application and a second identifier may be associated with the second application. The NFC controller may be capable of generating a third identifier from said first and second identifiers, said third identifier comprising a collision pattern. The NFC controller may be adapted to emit this third identifier in response to an anti-collision command.

Advantageously, said first and second applications may be embedded in a secure element, the NFC controller may be capable of communicating in contact mode through a single wire link, a first gate may be associated with the first application, a second gate may be associated with the second application and the NFC controller may be adapted to manage simultaneously several distinct gates.

In one embodiment, said first and second communications may be pending and the NFC controller may be adapted to manage said first and second communications through the single wire link.

Advantageously, the secure element may be a Single Wire Protocol compliant element which supports the card emulation mode and the single wire link may comply with the Single Wire Protocol.

Alternatively, the first application may be embedded in a first secure element and the second application may be embedded in a second secure element. The NFC controller may be capable of communicating with said first secure element in contact mode through a first single wire link and the NFC controller may be able to communicate with the second secure element in contact mode through a second single wire link. The NFC controller may be adapted to manage simultaneously said first and second communications through the two single wire links.

Advantageously, the NFC controller may be adapted to communicate with the first secure element by using the Single Wire Protocol and to communicate with the second secure element by using the Single Wire Protocol.

Another object of the invention is a portable device comprising a secure element and a NFC controller according to a first aspect of the invention. The secure element comprises two applications which are intended to communicate with a contactless reader device through the NFC controller.

Advantageously, the secure element may be capable of communicating through the Single Wire Protocol and may support the card emulation mode.

Another object of the invention is a method for managing both a first communication between a contactless reader device and a first application and a second communication between the contactless reader device and a second application. A NFC controller is capable of communicating in contact mode with said first and second applications. The NFC controller is capable of establishing and managing the first communication between the contactless reader device and the first application by using a specific type of contactless protocol. The NFC controller is capable of establishing and managing the second communication between the contactless reader device and the second application by using the specific type of contactless protocol. The method comprises the step of handling simultaneously said first and second communications into the NFC controller.

Advantageously, the contactless reader device may be capable of detecting the presence of a plurality of contactless cards in its electromagnetic field and the method may comprise the further step of simulating the presence of several contactless cards in the field of the reader device during an anti-collision phase. The simulating step may be carried out by the NFC controller.

In one embodiment, a first identifier may be associated with the first application and a second identifier may be associated with the second application. During the simulating step a third identifier may be emitted in response to an anti-collision command. Said third identifier may comprise a collision pattern and may be generated by the NFC controller from said first and second identifiers.

Advantageously, said first and second applications may be embedded in a secure element and the NFC controller may be able to communicate in contact mode through a single wire link. The method may comprise the step of multiplexing said first and second communications through the single wire link.

In one embodiment, the first application may be embedded in a first secure element and the second application may be embedded in a second secure element. The NFC controller may be capable of communicating with the first secure element in contact mode through a first single wire link. The NFC controller may be capable of communicating with the second secure element in contact mode through a second single wire link. The method may comprise the step of routing said first communication through the first single wire link and routing the second communication through the second single wire link.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

A NFC controller is a hardware module also named ContactLess Front-end chip (CLF). The invention may apply to any types of NFC controller which are able to manage a card emulation mode. The invention may apply to any types of NFC devices which embed such NFC controller. These devices may be portable devices like mobile phone or Electronic Funds Transfer Terminals for payment. These devices may also be fixed devices like smart poster as known as tag.

The invention relies on the fact that the NFC controller is adapted to manage several card emulation modes using the same type of contactless protocol at the same time.

An advantage of the invention is to allow a NFC device to manage communications for a plurality of applications using the same type of contactless protocol at the same time. Thus the user of the NFC device may have several applications simultaneously active without the necessity for the user to select one of the applications. For instance, a NFC handset may act as a wallet with several emulated contactless cards inside. Without the invention, the user of the NFC device must explicitly deactivate all applications except one before establishing a contactless transaction. Moreover the user may not know which application is to be used.

Figure 1:
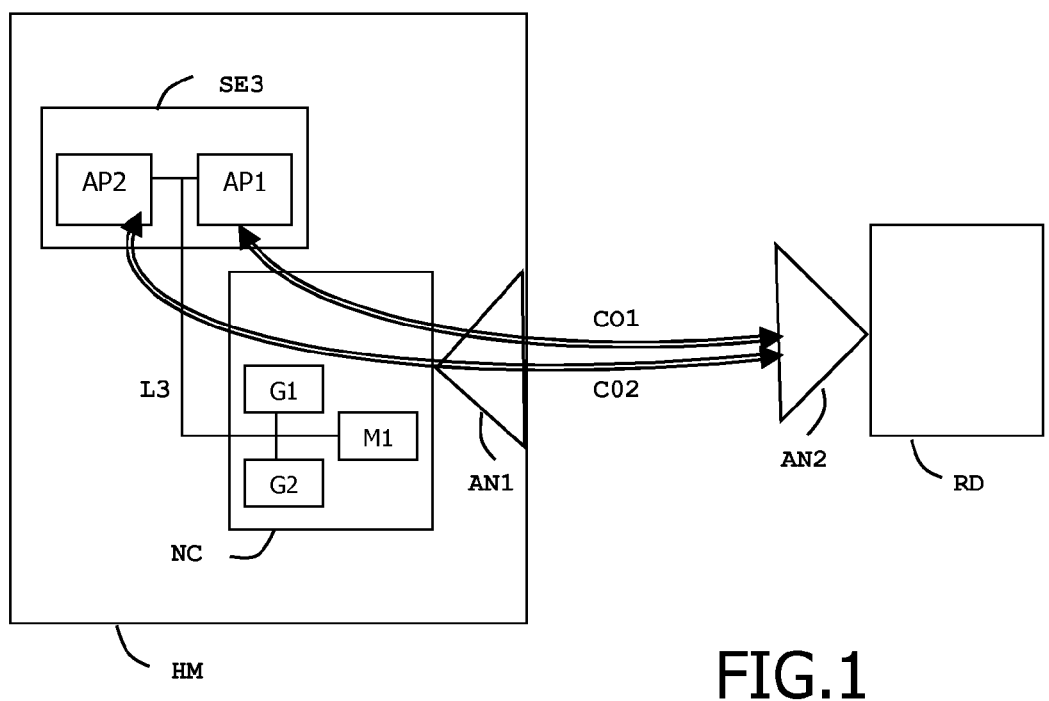
FIG. 1 depicts schematically an example of communications between a NFC reader and two applications embedded in a single secure element of a NFC device according to the invention.

FIG. 1 shows an example of simultaneous communications between a NFC device in reader mode and two applications which are embedded in a single secure element of a NFC device according to the invention. The NFC device HM may be a Mobile phone or any other type of NFC device intended to work in card emulation mode.

The NFC device in reader mode is a NFC reader RD which has its own antenna AN2.

The device HM comprises an antenna AN1, a NFC controller NC and a secure element SE3.

In a preferred embodiment, the secure element SE3 is a Universal Integrated Circuit Card (UICC).

Alternatively, the secure element SE3 may be a Secure Digital (SD) card, a miniSD card, a microSD card, an embedded secure element, a smart card or even a software secure element. The secure element is seen by the NFC controller as a host according to the ETSI TS102613 and ETSI TS102622 standards.

The secure element SE3 is able to manage the card emulation mode as defined by the ETSI TS102622 standard.

The NFC controller NC and the secure element SE3 are linked by a single wire link L3. The link L3 allows a communication in contact mode between the NFC controller NC and the secure element SE3. In a preferred embodiment, both the NFC controller NC and the secure element SE3 use the Single Wire protocol (SWP) as defined by the TS 102.613.

The secure element SE3 comprises two applications AP1 and AP2 which are intended to communicate with the NFC reader RD. Both applications are associated with the same type of contactless protocol. The selected contactless protocol may be compliant with ISO14443, ISO18092 or ISO15693 standards. The contactless protocol may also comply with proprietary specifications. In a preferred embodiment, AP1 and AP2 are associated with the type A of ISO14443 standard.

For example, the application AP1 may be a Transport application which provides access to a public transport network and the application AP2 may be a Payment application. The kind of these applications is not restricted. These applications may be electronic ticketing, e-wallet, debit/credit payment card, electronic keys for accessing a car/a house/a room, etc. The NFC reader RD comprises a reader-part application (not drawn) which is intended to communicate with one application of the secure element SE3.

In the embodiment of FIG. 1, the NFC controller NC contains two gates G1 and G2. The gate G1 is associated with the application AP1 and the gate G2 is associated with the application AP2. For each active gate, the controller NC manages a set of associated resources, like ATQA, SAK, UID and all other parameters which are defined in the registry of table 29 in ETSI TS102622, Thus the controller NC may contain as many sets of associated resources as gates. Thanks to these two gates, the NFC controller NC is capable of managing simultaneously a communication CO1 between the application AP1 and the reader RD and a communication CO2 between the application AP2 and the reader RD.

The NFC controller NC comprises a means M1 that is able to generate an identifier CUID from both the identifiers of the applications AP1 and AP2. The means M1 is capable of generating an identifier CUID which comprises a collision pattern according to the type of contactless protocol associated with the applications AP1 and AP2. The collision pattern allows the NFC reader device RD to detect a collision between two identifiers and to start the step of selection of applications via the identifiers.

In the embodiment of FIG. 1, the secure element SE3 is adapted to manage several pipes though the link L3. In particular, the secure element SE3 is able to simultaneously manage a communication between the application AP1 and the gate G1 via the link L3 and a communication between the application AP2 and the gate G2 via the same link L3. In comparison with secure elements of the prior art, the secure element SE3 has a specific means that is capable of routing the data exchanged through the link L3 to the relevant application (i.e. either AP1 or AP2).

Consequently, the NFC controller NC is able to establish and to manage the two communications CO1 and CO2 between the contactless reader device RD and the two applications AP1 and AP2 by handling the two communications at the same time.

Since the two applications AP1 and AP2 communicate with a unique reader RD through the same type of contactless protocol, the two applications are seen by the reader device RD as applications embedded by two (emulated) contactless cards. Consequently, there is a need for managing an anti-collision step. The NFC controller answers to the NFC reader only one specific identifier which contains a collision pattern in response to an anti-collision command. Thus a collision occurs when the NF reader RD receives this specific identifier. The usual anti-collision mechanism allows the NFC reader to select a contactless card through its corresponding identifier. According to the invention, several physical contactless cards are simulated for the reader RD and the anti-collision mechanism allows the NFC reader RD to select one of the simulated contactless cards through its corresponding identifier.

Figures 2, 3:
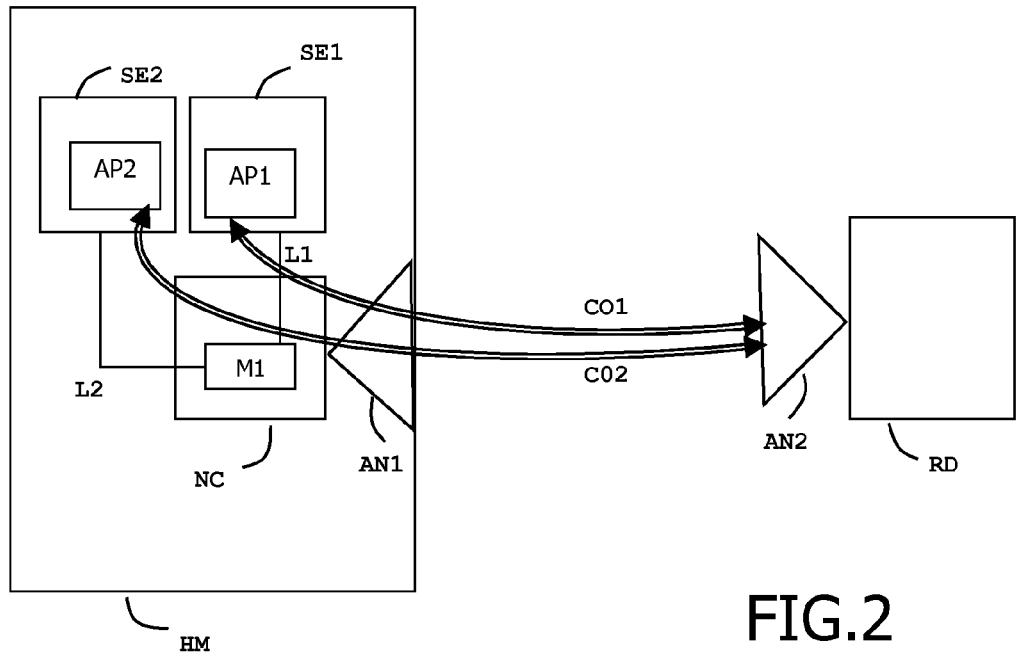
FIG. 2 depicts schematically an example of communications between a NFC reader and two applications embedded in two distinct secure elements of a NFC device according to the invention.
FIG. 3 is an example of UID used during an ISO14443 type A anti-collision step according to the invention.

FIG. 3 is an example of Unique Identifier (UID) which may be used during an ISO14443 type A anti-collision step according to a preferred embodiment of the invention.

The identifier UID1 is associated with the application AP1 and the identifier UID2 is associated with the application AP2. The means M1 of NFC controller NC is capable of generating an identifier CUID from both UID1 and UID2. The identifier CUID comprises a collision pattern which is detected by the reader device RD as a collision between several identifiers. The NFC controller NC is adapted to emit the identifier CUID in response to an anti-collision command. Thanks to this specific identifier CUID, the reader device RD is able to detect a collision and to select one of the applications available AP1 or AP2 through the usual anti-collision mechanism of ISO14443 type A.

Usually, the identifiers are 32-bits longs. In the example of FIG. 3, the identifier UID1 is equal to A0 45 C0 01 and UID2 is equal to A0 74 C0 01 in hexadecimal. The value of the two identifiers UID1 and UID2 are made of a series of bits. In other words, the value of the identifier UID1 is 1010 0000 0100 0101 1100 0000 0000 0001 and the value of the identifier UID2 is 1010 0000 0111 0100 1100 0000 0000 0001 in binary format.

The two identifiers UID1 and UID2 differ by the value of three bits (eleventh, twelfth and sixteenth bits). The NFC controller NC has a means M1 able to generate the identifier CUID comprising a collision pattern instead of the three different bits. For example, the value of the identifier CUID is 1010 0000 01XX 010X 1100 0000 0000 0001 in binary format. The collision pattern is written as "X". The collision pattern represents a pattern that simulates a logical 0 and a logical 1 during the same bit duration. The collision pattern may be generated as the combination of the signal usually emitted for a bit having a value equal to zero and of the signal usually emitted for a bit having a value equal to one. The collision pattern is naturally generated by the presence of several cards at the same time in a RF (radio frequency) field. The generation of the collision pattern allows emulating a collision from the reader point of view. After the selection of one application identifier, the NFC controller forwards all contactless messages received on the RF interface to the corresponding SWP gate interface. The NFC controller NC manages the association between application identifier and the associated gate.

When the two applications AP1 and AP2 are active and have pending communications CO1 and CO2 with the NFC reader RD, the NFC controller NC is able to manage the multiplexing of the two communications through the single wire link L3. In other words, the NFC controller NC is capable of managing several logical communication channels on a single physical channel. In the present description the word <<active>> means that the applications are both functional and reachable in a direct manner. Put differently, the applications are both automatically selectable by the NFC reader RD without user action nor initialization step when switching from an application to another one. Both applications may be accessed as if they were in distinct physical cards.

In one embodiment, the identifier CUID may be generated as the addition (or concatenation) of the two identifiers UID1 and UID2.

In an embodiment, the applications AP1 and AP2 are associated with the type B of ISO14443 standard. In this case, the generated identifier CUID corresponds to two identifiers present on the same time slot.

FIG. 2 shows an example of simultaneous communications between a NFC device in reader mode and two applications which are embedded in a two distinct secure elements of a NFC device according to the invention. The NFC device HM may be any type of NFC device intended to work in card emulation mode.

The NFC device which is in reader mode is a NFC reader RD which has its own antenna AN2.

The device HM comprises an antenna AN1, a NFC controller NC and two secure elements SE1 and SE2.

In a preferred embodiment, the secure element SE1 is a MicroSD card and the secure element SE2 is a Universal Integrated Circuit Card (UICC). Both the MicroSD card and the UICC are able to communicate with the Single Wire protocol (SWP).

Alternatively, the secure elements SE1 and SE2 may be a Secure Digital (SD) card, a Mini-SD card, an embedded secure element, a SIM card, or any other kind of secure element able to communicate with a NFC controller. The NFC controller NC and the secure element SE1 are linked by a single wire link L1. The NFC controller NC and the secure element SE2 are linked by a single wire link L2. Each of the links L1 and L2 allows a communication in contact mode between the NFC controller NC and the corresponding secure element. In a preferred embodiment, the NFC controller NC and the two secure elements use the Single Wire protocol (SWP) as defined by the TS 102.613.

The secure element SE1 comprises an application AP1 and the secure element SE2 comprises an application AP2. Both applications AP1 and AP2 are intended to communicate with the NFC reader RD. Both applications are associated with the same type of contactless protocol. The selected contactless protocol may be compliant with ISO14443, ISO18092 or ISO15693 standards. The contactless protocol may also comply with proprietary specifications. In a preferred embodiment, AP1 and AP2 are associated with the type A of ISO14443 standard.

For example, the application AP1 may be a smart poster application and the application AP2 may be an e-purse application. Alternatively, these applications may be electronic ticketing, e-wallet, a debit/credit payment card, electronic keys for accessing a car/a house/a room, or any kind of contactless application.

In the embodiment of FIG. 2, the NFC controller NC contains a means M1 which is able to generate an identifier CUID from both the identifiers of the applications AP1 and AP2. The means M1 is able to generate an identifier CUID which comprises a collision pattern according to the type of contactless protocol associated with the applications AP1 and AP2. The collision pattern allows a NFC reader device to detect a collision between two identifiers and to start the step of selection of applications via the identifiers UID1 and UID2.

In the embodiment of FIG. 2, the NFC controller NC is adapted to manage simultaneously several links. In particular, the NFC controller NC is able to simultaneously manage a communication between the application AP1 and a NFC reader via the link L1 and a communication between the application AP2 and a NFC reader via the link L2. The NFC controller NC is able to route the messages received from the NFC reader RD to the relevant link in order to reach the targeted application.

In the embodiment of FIG. 2, the NFC controller NC contains a specialized means which is capable of managing several registry contents as described in table 29 of ETSI TS102622. The specialized means manages a registry for each physical link. For instance, the specialized means manages a first registry associated with the link L1 and a second registry associated with link L2.

When the two applications AP1 and AP2 communicate with a unique reader device RD through the same type of contactless protocol, the two applications are seen by the reader device RD as two emulated contactless cards. Consequently, there is a need for managing an anti-collision step. The NFC controller answers to the NFC reader only one specific identifier which contains a collision pattern in response to an anti-collision command. According to an embodiment of the invention, the anti-collision mechanism allows the NFC reader to select an application through its corresponding identifier. The above-example of CUID identifier generation (See FIG. 3) and anti-collision mechanism managed by the NFC reader RD which are described for the embodiment of FIG. 1 also apply to the embodiment of the FIG. 2.

In the example of FIG. 2, both secure elements SE1 and SE2 behaves like usual secure elements. They do not require specific adaptation.

In the embodiment of FIG. 2, the NFC device HM is able to manage a plurality of active secure elements at the same time. Thus the user of the NFC device may have several applications simultaneously active without the necessity for the user to select one of the secure elements.

Most of the time, the secure elements are removable. An advantage of the embodiment of FIG. 2 is to avoid configuring manually the NFC device HM at each insertion of a secure element into the NFC device HM. The configuration is automatically managed by the NFC controller.

In another embodiment, the examples described at FIGS. 1 and 2 may be combined. The NFC device HM may comprise several secure elements which comprise several applications associated with the same type of contactless protocol.

The above described embodiments provide examples with two applications. The invention is not restricted to a limited number of applications which communicate simultaneously with a NFC reader. For instance, the NFC controller according to the invention may manage the communication for three or four applications at the same time.

The secure element SE3 of FIG. 1 may be connected to a usual NFC controller which is not able to manage the communication according to the invention. In this case, the secure element SE3 may comprise an additional means which allow to select the application (i.e. either AP1 or AP2) to be activated. Thank to this additional means the secure element SE3 may be configured for working with existing NFC controllers.

The invention claimed is:

1. A NFC controller able to communicate in contact mode with first and second applications, wherein said NFC controller is able to establish and to manage a first communication between a contactless reader device and the first application by using a specific type of contactless protocol, wherein the NFC controller is able to establish and to manage a second communication between the contactless reader device and the second application by using said specific type of contactless protocol, wherein said first and second applications are embedded in a secure element, wherein the NFC controller is able to communicate with said secure element in contact mode through a single wire link, wherein the NFC controller is adapted to manage simultaneously said first and second communications through said single wire link, wherein the NFC controller comprises first and second gates, wherein said first gate is associated with the first application and said second gate is associated with the second application, wherein said NFC controller is adapted to manage simultaneously said first and second communications through said single wire link and wherein the NFC controller is configured to multiplex said first and second communications through the single wire link.

2. A NFC controller according to claim 1, wherein said first and second communications are pending and wherein said NFC controller is adapted to manage said first and second communications through the single wire link.

3. A NFC controller according to claim 1, wherein the secure element is a Single Wire Protocol compliant element supporting card emulation mode and the single wire link complies with the Single Wire Protocol.

4. A NFC controller according to claim 1, wherein the contactless reader device is able to detect the presence of a plurality of contactless cards in its electromagnetic field and wherein the NFC controller is adapted to simulate the presence of several contactless cards in the field of the reader device during an anti-collision phase.

5. A NFC controller according to claim 4, wherein a first identifier is associated with the first application and a second identifier is associated with the second application, wherein the NFC controller is able to generate a third identifier from said first and second identifiers, said third identifier comprising a collision pattern and wherein the NFC controller is adapted to emit the third identifier in response to an anti-collision command.

6. A portable device comprising a secure element and a NFC controller according to claim 1, wherein said secure element comprises two applications intended to communicate with a contactless reader device through the NFC controller.

7. A portable device according to claim 6, wherein said secure element is able to communicate through the Single Wire Protocol and supports the card emulation mode.

8. A NFC controller according to claim 1, wherein said first gate and said second gate are gates according to ETSI TS 102 622.

9. A method for managing first and second communications between a contactless reader device and a first application, respectively a second application, wherein a NFC controller is able communicate in contact mode with said first and second applications, wherein the NFC controller is able to establish and to manage the first communication between the contactless reader device and the first application by using a specific type of contactless protocol, wherein the NFC controller is able to establish and to manage the second communication between the contactless reader device and the second application by using the specific type of contactless protocol, wherein said first and second applications are embedded in a secure element, wherein the NFC controller is able to communicate with said secure element in contact mode through a single wire link, wherein the method comprises the step of managing simultaneously said first and second communications through said single wire link into the NFC controller and wherein the method comprises the step of multiplexing said first and second communications through the single wire link.

10. A method according to claim 9, wherein the contactless reader device is able to detect the presence of a plurality of contactless cards in its electromagnetic field and wherein said method comprises the further step of simulating the presence of several contactless cards in the field of the reader device during an anti-collision phase, said simulating step being carried out by the NFC controller.

11. A method according to claim 10, wherein a first identifier is associated with the first application and a second identifier is associated with the second application, and wherein during the simulating step a third identifier is emitted in response to an anti-collision command, said third identifier comprising a collision pattern and being generated by the NFC controller from said first and second identifiers.

12. A NFC controller able to communicate in contact mode with first and second applications, wherein said NFC controller is able to establish and to manage a first communication between a contactless reader device and the first application by using a specific type of contactless protocol, wherein the NFC controller is able to establish and to manage a second communication between the contactless reader device and the second application by using said specific type of contactless protocol, wherein said first and second applications are embedded in a secure element, wherein the NFC controller is able to communicate with said secure element in contact mode through a single wire link, wherein the NFC controller is adapted to manage simultaneously said first and second communications through said single wire link, wherein a first gate is associated with the first application and a second gate is associated with the second application, wherein said NFC controller is adapted to manage simultaneously several distinct gates and wherein the contactless reader device is able to detect the presence of a plurality of contactless cards in its electromagnetic field and wherein the NFC controller is adapted to simulate the presence of several contactless cards in the field of the reader device during an anti-collision phase.

13. A NFC controller according to claim 12, wherein a first identifier is associated with the first application and a second identifier is associated with the second application, wherein the NFC controller is able to generate a third identifier from said first and second identifiers, said third identifier comprising a collision pattern and wherein the NFC controller is adapted to emit the third identifier in response to an anti-collision command.

14. A portable device comprising a secure element and a NFC controller according to claim 12, wherein said secure element comprises two applications intended to communicate with a contactless reader device through the NFC controller.

15. A portable device according to claim 14, wherein said secure element is able to communicate through the Single Wire Protocol and supports the card emulation mode.

\* \* \* \* \*